US012767774B2

(12) United States Patent
Kaneko et al.

(10) Patent No.: US 12,767,774 B2
(45) Date of Patent: Oct. 20, 2026

(54) HEAT-SHRINKABLE POLYESTER FILM

(71) Applicants: C.I. TAKIRON Corporation, Osaka (JP); Bonset America Corporation, Browns Summit, NC (US); Bonset Latin America S.A., Barros Blancos Canelones (UY)

(72) Inventors: Takuma Kaneko, Osaka (JP); Yuichiro Kanzaka, Osaka (JP); Shuuta Yuge, Osaka (JP); Tatsuya Irifune, Osaka (JP); Masanao Miyoshi, Osaka (JP)

(73) Assignees: C.I. Takiron Corporation, Osaka (JP); Bonset America Corporation, Browns Summit, NC (US)

( * ) Notice: Subject to any disclaimer, the term of this patent is extended or adjusted under 35 U.S.C. 154(b) by 622 days.

(21) Appl. No.: 18/245,389

(22) PCT Filed: Oct. 30, 2020

(86) PCT No.: PCT/JP2020/040859
§ 371 (c)(1),
(2) Date: Mar. 15, 2023

(87) PCT Pub. No.: WO2022/091355
PCT Pub. Date: May 5, 2022

(65) Prior Publication Data

US 2023/0348681 A1 Nov. 2, 2023

(51) Int. Cl.

| | |
|---|---|
| ***C08J 5/18*** | (2006.01) |
| ***C08L 67/02*** | (2006.01) |
| *B29C 48/00* | (2019.01) |
| *B29C 48/08* | (2019.01) |
| *B29C 55/14* | (2006.01) |
| *B29C 61/06* | (2006.01) |
| *B29K 67/00* | (2006.01) |
| *B29K 105/02* | (2006.01) |

(52) U.S. Cl.
CPC ................ *C08J 5/18* (2013.01); *C08L 67/02* (2013.01); *B29C 48/0018* (2019.02); *B29C 48/08* (2019.02); *B29C 55/143* (2013.01); *B29C 61/06* (2013.01); *B29K 2067/003* (2013.01); *B29K 2105/02* (2013.01); *C08J 2367/02* (2013.01); *C08J 2467/02* (2013.01); *C08L 2203/162* (2013.01); *C08L 2205/025* (2013.01)

(58) Field of Classification Search
None
See application file for complete search history.

(56) References Cited

U.S. PATENT DOCUMENTS

| | | | | |
|---|---|---|---|---|
| 2006/0275564 | A1* | 12/2006 | Grah | B32B 27/08 264/479 |
| 2011/0130480 | A1* | 6/2011 | Bayer | C08L 67/02 521/182 |
| 2014/0162042 | A1* | 6/2014 | Shih | C08K 5/11 428/220 |
| 2015/0014202 | A1 | 1/2015 | Huruta et al. | |
| 2021/0214583 | A1 | 7/2021 | Kaneko et al. | |

FOREIGN PATENT DOCUMENTS

| | | | |
|---|---|---|---|
| JP | 2003311828 | A | 11/2003 |
| JP | 2004017369 | A | 1/2004 |
| JP | 2007197711 | A | 8/2007 |
| JP | 2009160775 | A | 7/2009 |
| JP | 2012-36273 | A | 2/2012 |
| JP | 2018-168382 | A | 11/2018 |
| KR | 1020140096176 | | 8/2014 |
| WO | 2019/230843 | A1 | 12/2019 |

OTHER PUBLICATIONS

Turner, S.R. (2004), Development of amorphous copolyesters based on 1,4-cyclohexanedimethanol. J. Polym. Sci. A Polym. Chem., 42, 5847-5852. (Year: 2004).*

Polycaprolactone, Polysciences (retrieved on: Feb. 10, 2026, retrieved from: https://polysciences.com/products/polycaprolactone-mw-25000#:~:text=Product%20Description&text=Polycaprolactone%20(PCL)%20is%20a%20biodegradable,industrial%20materials%20and%20packaging%20applications). (Year: 2026).*

* cited by examiner

*Primary Examiner* — Robert S Jones, Jr.
*Assistant Examiner* — Lily K Sloan
(74) *Attorney, Agent, or Firm* — Renner, Kenner; Arthur M. Reginelli

(57) ABSTRACT

A heat-shrinkable polyester film that effectively suppresses a breakage phenomenon is provided. Disclosed is a heat-shrinkable polyester film derived from a polyester resin, the heat-shrinkable polyester film satisfying the following configurations (a) to (c): (a) a thermal shrinkage ratio in the TD direction obtainable under the conditions of 10 seconds in hot water at 80° C. as designated A1 is a value of 25% or greater; (b) when a thermal shrinkage ratio in the TD direction obtainable under the conditions of 10 seconds in hot water at 90° C. as designated A2 is a value of 40% or greater; and (c) when the upper yield point stress is E1 and the lower yield point stress is E2, a numerical value represented by E1−E2 is a value of 5 MPa or less.

8 Claims, 8 Drawing Sheets

HEAT-SHRINKABLE POLYESTER FILM

TECHNICAL FIELD

The present invention relates to a heat-shrinkable polyester film (sometimes called as a polyester-based shrink film etc.).

More specifically, the invention relates to a heat-shrinkable polyester film in which breakage preventing properties or tensile breaking strength at the time of thermal shrinkage and the like are improved even when the heat-shrinkable polyester film practically does not include a predetermined plasticizer.

BACKGROUND ART

Shrink films are conventionally widely used as base films for labels of PET bottles and the like. Particularly, heat-shrinkable polyester films are excellent in terms of mechanical strength, transparency, and the like, and accordingly, it is the situation in which the market share of heat-shrinkable polyester films as base films for labels is increasing.

Such a heat-shrinkable polyester film has excellent mechanical characteristics and the like; however, there is observed a problem that when a heat-shrinkable polyester film is heated and caused to shrink, tension, impact, and the like occur as a result of a rapid thermal response, and the film itself becomes easily breakable.

Thus, in order to improve impact resistance and the like, it has been proposed to blend a predetermined polyester plasticizer and the like into a raw material of a heat-shrinkable polyester film (see, for example, Patent Document 1).

More specifically, such a heat-shrinkable polyester film includes: (a) a copolyester having a minimum crystallization half-time ($t_{1/2}$ minutes) of at least 8.6 minutes; and (b) a polyester plasticizer having a weight average molecular weight (Mw) of 900 to 12000 g/mol.

Furthermore, the copolyester includes:

(i) a dibasic acid component including 100 mol % of a residue of terephthalic acid; and (ii) a diol component including a residue of ethylene glycol, 1,4-cyclohexanedimethanol, diethylene glycol, neopentyl glycol, 2,2,4,4-tetramethyl-1,3-cyclobutanediol, or a mixture of these.

In addition, the polyester plasticizer includes:

(i) a polyol component including a residue of 1,2-propanediol, 1,3-butanediol, 1,4-butanediol, or a mixture of these; and (ii) a dibasic acid component including a residue of phthalic acid, adipic acid, or a mixture of these.

Then, the heat-shrinkable polyester film has a glass transition temperature of 50° C. to 90° C. as measured under predetermined conditions.

CITATION LIST

Patent Document

Patent Document 1: JP 2018-168382 A (claims etc.)

SUMMARY OF THE INVENTION

Problem to be Solved by the Invention

However, with regard to the heat-shrinkable polyester film described in Patent Document 1, there is a problem that the predetermined polyester plasticizer may bleed out depending on a change in ambient temperature or an elapsed time, and in addition, there is observed a tendency that the shrinkage ratio and mechanical characteristics are lowered, and depending on the blending amount, characteristics such as transparency and electrical characteristics are also lowered.

Thus, the inventors of the present invention found that when the thermal shrinkage ratios (A1, A2) of a heat-shrinkable polyester film at 80° C. and 90° C. in 10 seconds are each set to be equal to or greater than a predetermined value, and the difference (E1–E2) between the upper yield point stress and the lower yield point stress in an SS curve of the film is set to be equal to or lower than a predetermined value, without using a polyester plasticizer, breakage preventing properties and the like of the shrink film are markedly improved, thus completing the present invention.

That is, it is an object of the present invention to provide a heat-shrinkable polyester film that stably undergoes thermal shrinkage or the like when subjected to thermal shrinkage under the predetermined conditions, and has excellent breakage preventing properties and the like, even in a case where a predetermined plasticizer is practically not blended.

Means for Solving Problem

According to the present invention, there is provided a heat-shrinkable polyester film derived from a polyester resin, the heat-shrinkable polyester film having the following configurations (a) to (c), and the above-described problems can be solved.

(a) When a main shrinkage direction is designated as TD direction, and a thermal shrinkage ratio in the TD direction obtainable in a case where the heat-shrinkable polyester film is caused to shrink under the conditions of 10 seconds in hot water at 80° C. is designated as A1, A1 is set to a value of 25% or greater.

(b) When a thermal shrinkage ratio in the TD direction obtainable in a case where the heat-shrinkable polyester film is caused to shrink under the conditions of 10 seconds in hot water at 90° C. is designated as A2, the A2 is set to a value of 40% or greater.

(c) When an upper yield point stress in a stress-strain curve (SS curve) in the TD direction is designated as E1, and a lower yield point stress in the stress-strain curve in the TD direction is designated as E2, a numerical value represented by E1–E2 is set to a value of 5 MPa or less.

That is, it is because when the configurations (a) and (b) are satisfied, in a heat-shrinkable polyester film at the time of thermal shrinkage, a satisfactory thermal shrinkage ratio is obtained within a predetermined temperature range, and satisfactory breakage preventing properties are also obtained at the time of thermal shrinkage.

Furthermore, when the configuration (c) is satisfied, even in a case where the values of the thermal shrinkage ratios of the configurations (a) and (b) vary to some extent, contributors of predetermined influential factors can be reduced, non-uniform shrinkage caused by a rapid thermal response can be suppressed, and as a result, satisfactory breakage preventing properties can be exhibited.

Therefore, by limiting each of these thermal shrinkage ratios A1, A2, and E1–E2 to a value within a predetermined range, satisfactory film breakage preventing properties can be obtained while maintaining satisfactory thermal shrinkability.

Incidentally, for example, as described in Evaluation 11, when the number of test specimens that cause a breakage phenomenon out of ten test specimens produced from the heat-shrinkable polyester film of the present invention, is 0 or 1 or less, breakage preventing properties are considered satisfactory.

Furthermore, on the occasion of configuring the heat-shrinkable polyester film of the present invention, it is preferable that the value of E1, which is the upper yield point stress, is greater than the value of E2, which is the lower yield point stress, E1 is set to a value within the range of 95 to 120 MPa, and E2 is set to a value within the range of 90 to 115 MPa.

With regard to the relationship between E1 and E2, by specifically limiting E1 and E2 to values within predetermined ranges in this manner, more satisfactory film breakage preventing properties can be obtained while maintaining satisfactory thermal shrinkability.

Furthermore, on the occasion of configuring the heat-shrinkable polyester film of the present invention, it is preferable that a numerical value represented by E2/E1, which is a ratio of stress at the upper yield point, E1, and stress at the lower yield point, E2, is set to be above 0.9.

By specifically limiting the numerical value represented by E2/E1 to a value within a predetermined range in this manner, it is easy to control the numerical value represented by E1−E2 to a predetermined range, and breakage preventing properties at the time of thermal shrinkage of the film can be further improved.

Furthermore, on the occasion of configuring the heat-shrinkable polyester film of the present invention, when a direction orthogonally intersecting the TD direction is designated as MD direction, and a thermal shrinkage ratio in a case where the heat-shrinkable polyester film is caused to shrink in this MD direction under the conditions of 10 seconds in hot water at 80° C. is designated as B1, it is preferable that this B1 is set to a value of 3% or greater.

By specifically limiting the thermal shrinkage ratio represented by B1 to be equal to or greater than a predetermined value in this manner, the influential factors for the numerical value represented by E1−E2 can be reduced, and breakage preventing properties at the time of thermal shrinkage of the film can be further improved.

Furthermore, on the occasion of configuring the heat-shrinkable polyester film of the present invention, when a direction orthogonally intersecting the TD direction is designated as MD direction, and a thermal shrinkage ratio in a case where the heat-shrinkable polyester film is caused to shrink in this MD direction under the conditions of 10 seconds in hot water at 90° C. is designated as B2, it is preferable that this B2 is set to a value of 4% or greater.

By specifically limiting the thermal shrinkage ratio represented by B2 to be equal to or greater than a predetermined value in this manner, the influential factors for the numerical value represented by E1−E2 can be reduced, and breakage preventing properties at the time of thermal shrinkage of the film can be further improved.

On the occasion of configuring the heat-shrinkable polyester film of the present invention, when a nominal tensile strain at break in the TD direction as measured according to JIS K 7127/2/200 (1999) is designated as C1, it is preferable that this C1 is set to a value of 40% or greater.

By specifically limiting the numerical value represented by C1 to a value within a predetermined range in this manner, the mechanical characteristics of the heat-shrinkable polyester film can be improved, and furthermore, breakage preventing properties at the time of thermal shrinkage of the film can be further improved.

Furthermore, on the occasion of configuring the heat-shrinkable polyester film of the present invention, it is preferable that a haze value of the film before shrinkage as measured according to JIS K7105 is set to a value of 5% or less.

By specifically limiting the haze value to a value within a predetermined range in this manner, transparency of the heat-shrinkable polyester film can also be easily controlled quantitatively, and since transparency is satisfactory, general-purpose usability can be further increased.

Furthermore, on the occasion of configuring the heat-shrinkable polyester film of the present invention, it is preferable that a non-crystalline polyester is included at a proportion in the range of 90% to 100% by weight of a total quantity of resins.

By specifically limiting the content of the non-crystalline polyester resin in this manner, the thermal shrinkage ratio and breakage preventing properties in the vicinity of the shrinkage temperature (for example, 80° C. to 90° C.; hereinafter, the same temperature condition) can be improved to satisfactory level, and at the same time, the haze value and the like can be easily controlled quantitatively.

Incidentally, the balance of the non-crystalline polyester resin in the total quantity of resins is a value contributed by a crystalline polyester resin and a resin other than a polyester resin.

MODE(S) FOR CARRYING OUT THE INVENTION

First Embodiment

A first embodiment is, as illustrated in FIG. 1, a heat-shrinkable polyester film 10 derived from a polyester resin, the heat-shrinkable polyester film 10 having the following configurations (a) to (c):

(a) when a main shrinkage direction is designated as TD direction, and a thermal shrinkage ratio in the TD direction obtainable in a case where the heat-shrinkable polyester film 10 is caused to shrink under the conditions of 10 seconds in hot water at 80° C. is designated as A1, A1 is set to a value of 25% or greater;

(b) when a thermal shrinkage ratio in the TD direction obtainable in a case where the heat-shrinkable polyester film 10 is caused to shrink under the conditions of 10 seconds in hot water at 90° C. is designated as A2, the A2 is set to a value of 40% or greater; and (c) when the upper yield point stress in a stress-strain curve (SS curve) in the TD direction is designated as E1, and the lower yield point stress in the stress-strain curve in the TD direction is designated as E2, the numerical value represented by E1−E2 is set to a value of 5 MPa or less.

Figure 1A:
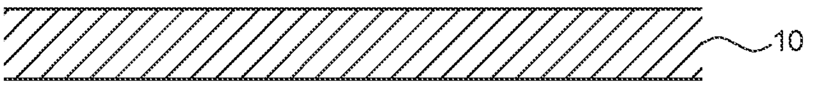
FIGS. 1A to 1C are each a diagram for describing a form of a heat-shrinkable polyester film.

Hereinafter, various parameters and the like will be specifically described with appropriate reference to FIGS. 1A to 1C, separately for the configurations of the heat-shrinkable polyester film of the first embodiment.

1. Polyester Resin

Basically, the type of the polyester resin does not matter; however, usually, the polyester resin is preferably a polyester resin formed from a diol and a dicarboxylic acid; a polyester resin formed from a diol and a hydroxycarboxylic acid; a polyester resin formed from a diol, a dicarboxylic acid, and a hydroxycarboxylic acid; or a mixture of these polyester resins.

Here, the diol as a compound component of the polyester resin may be at least one of aliphatic diols such as ethylene glycol, diethylene glycol, propanediol, butanediol, neopentyl glycol, and hexanediol; alicyclic diols such as 1,4-hexanedimethanol; aromatic diols; and the like.

Furthermore, the dicarboxylic acid as a compound component of the same polyester resin may be at least one of aliphatic dicarboxylic acids such as adipic acid, sebacic acid, and azelaic acid; aromatic dicarboxylic acids such as terephthalic acid, naphthalenedicarboxylic acid, and isophthalic acid; alicyclic dicarboxylic acids such as 1,4-cyclohexanedicarboxylic acid; ester-forming derivatives of these; and the like.

Furthermore, the hydroxycarboxylic acid as a compound component of the same polyester resin may be at least one of lactic acid, hydroxybutyric acid, polycaprolactone, and the like.

Furthermore, as a non-crystalline polyester resin, for example, a non-crystalline polyester resin formed from a dicarboxylic acid composed of at least 80 mol % of terephthalic acid, and a diol composed of 50 mol % to 80 mol % of ethylene glycol and 20 mol % to 50 mol % of one or more diols selected from 1,4-cyclohexanedimethanol, neopentyl glycol, and diethylene glycol, can be suitably used. In order to change the properties of the film as necessary, other dicarboxylic acids and diols or hydroxycarboxylic acids may also be used. Furthermore, each of the components may be used singly or as a mixture.

On the other hand, examples of a crystalline polyester resin include polyethylene terephthalate, polyethylene naphthalate, polybutylene terephthalate, polybutylene naphthalate, and polypropylene terephthalate, and each of these may be used singly or as a mixture.

Furthermore, in a case where the polyester resin is a mixture of a non-crystalline polyester resin and a crystalline polyester resin, in order to obtain satisfactory heat resistance, a satisfactory shrinkage ratio, and the like, it is preferable that the blending amount of the non-crystalline polyester resin is set to a value within the range of 90% to 100% by weight, and more preferably to a value within the range of 91% to 100% by weight, with respect to the total quantity of the resins constituting the heat-shrinkable polyester film.

2. Configuration (a)

Configuration (a) is a necessary configuration requirement to the effect that with regard to the heat-shrinkable polyester film of the first embodiment, the main shrinkage direction is designated as TD direction, the thermal shrinkage ratio in the TD direction in a case where the heat-shrinkable polyester film is caused to shrink under the conditions of 10 seconds in hot water at 80° C. is designated as A1, and this thermal shrinkage ratio A1 is set to a value of 25% or greater.

The reason for this is that when such 80° C. thermal shrinkage ratio A1 is specifically limited to be equal to or greater than a predetermined value, a satisfactory thermal shrinkage ratio is obtained, and furthermore, satisfactory breakage preventing properties are obtained, for the heat-shrinkable polyester film at the time of thermal shrinkage.

More specifically, it is because when the 80° C. thermal shrinkage ratio A1 of the film is set to a value of below 25%, the thermal shrinkage ratio is insufficient, and for a PET bottle having a complicated shape, the film becomes incapable of following the peripheral shape of that bottle so that a breakage phenomenon of the film at the time of thermal shrinkage may not be effectively suppressed.

Therefore, it is more preferable to set the lower limit of such 80° C. thermal shrinkage ratio A1 to a value of 30% or greater, and even more preferably to a value of 35% or greater.

On the other hand, in a case where the value of the above-mentioned 80° C. thermal shrinkage ratio A1 becomes excessively large, when the film is caused to thermally shrink, the film shrinks non-uniformly due to a rapid thermal response, and a breakage phenomenon at the time of thermal shrinkage may occur easily.

Therefore, it is preferable to set the upper limit of such 80° C. thermal shrinkage ratio A1 to a value of 80% or less, more preferably to a value of 75% or less, and even more preferably to a value of 70% or less.

Incidentally, the thermal shrinkage ratio for the shrink film of the first embodiment is defined by the following formula:

$$\text{Thermal shrinkage ratio (\%)}=(L_0-L_1)/L_0\times100$$

$L_0$: Dimension of sample before heat treatment (longitudinal direction or width direction)

$L_1$: Dimension of sample after heat treatment (same direction as $L_0$)

Here, referring to FIG. 2, the relationship between the thermal shrinkage ratio A1 of the heat-shrinkable polyester film obtainable under predetermined conditions (at 80° C. hot water for 10 seconds) and the thermal shrinkage ratio A2 obtainable under other predetermined conditions (at 90° C. hot water for 10 seconds) that will be described below, will be described.

Figure 2:
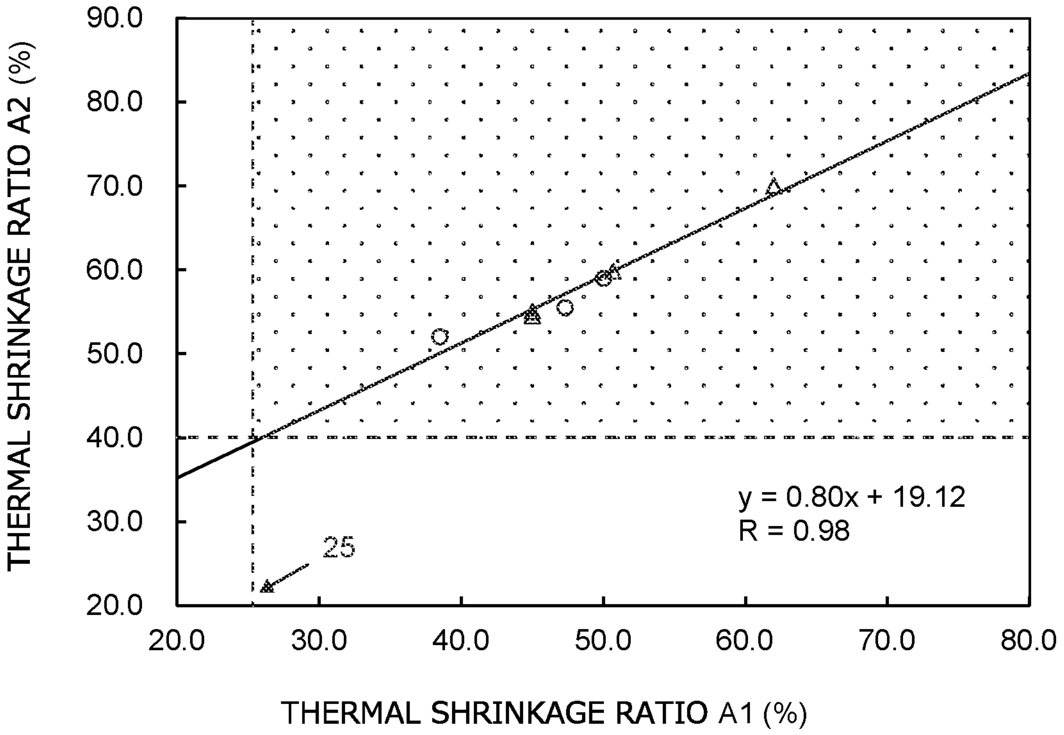
FIG. 2 is a diagram for describing a relationship between the shrinkage ratio (A1) of a heat-shrinkable polyester film under predetermined heating conditions (hot water at 80° C., for 10 seconds) and the shrinkage ratio (A2) under predetermined heating conditions (hot water at 90° C., for 10 seconds).

With regard to the measurement data shown in such FIG. 2, it is understood that there is an excellent correlation (coefficient of correlation (R) in linear approximation is 0.98) in the relationship between the thermal shrinkage ratio A1 and the thermal shrinkage ratio A2.

Next, referring to FIG. 3, a typical example of the SS curve in the TD direction of the heat-shrinkable polyester film in a tensile test under predetermined heating conditions (testing temperature: 23° C., testing rate: 200 mm/min), which is measured according to JIS K 7127, will be described.

Figure 3:
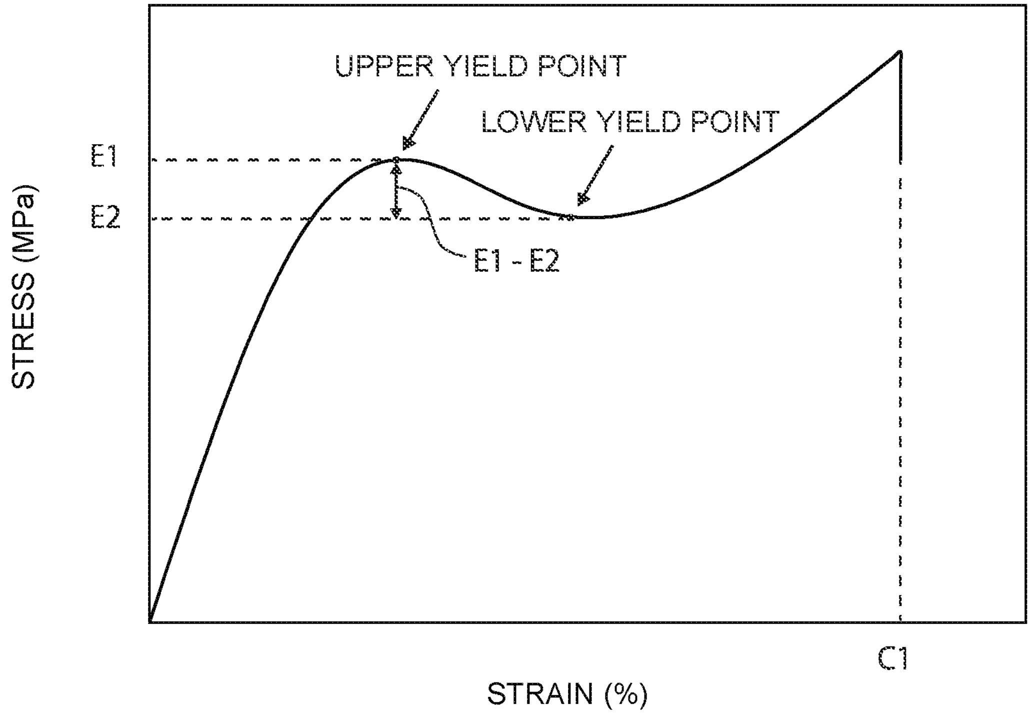
FIG. 3 is a typical example of an SS curve in the TD direction for a heat-shrinkable polyester film.

That is, the axis of abscissa of FIG. 3 represents the value of strain (%) in the TD direction of the heat-shrinkable polyester film, and the axis of ordinate represents the stress (MPa) corresponding to the strain.

Then, from the characteristic curve (SS curve) in such FIG. 3, it is understood that when the strain in the TD direction of the heat-shrinkable polyester film is increased, stress is generated correspondingly thereto, and the value thereof also increases.

Next, when the strain in the TD direction is further increased, crystal transition of the heat-shrinkable polyester film occurs, and an upward convex broad peak appears. This is stress corresponding to the peak and is defined as upper yield point stress (E1).

Next, when the strain in the TD direction is further increased, crystal transition of the heat-shrinkable polyester film occurs again, and a downward convex broad peak appears. This is stress corresponding to the peak and is defined as lower yield point stress (E2).

Next, when the strain in the TD direction is further increased, breakage of the heat-shrinkable polyester film occurs at a certain strain, and this is stress defined as nominal tensile strain at break (C1).

Then, the present invention is intended to find a predetermined relationship between the difference (E1−E2) of the upper yield point stress and the lower yield point stress of the heat-shrinkable polyester film and breakage preventing properties and the like at the time of thermal shrinkage, and to control the relationship.

3. Configuration (b)

Configuration (b) is a necessary configuration requirement to the effect that with regard to the heat-shrinkable polyester film of the first embodiment, the thermal shrinkage ratio in a case where the heat-shrinkable polyester film is caused to shrink under the conditions of 10 seconds in hot water at 90° C. is designated as A2, and this thermal shrinkage ratio A2 is set to a value of 40% or greater.

The reason for this is that when such 90° C. thermal shrinkage ratio A2 is specifically limited to be equal to or greater than a predetermined value, a satisfactory thermal shrinkage ratio is obtained, and furthermore, satisfactory breakage preventing properties are obtained, for the heat-shrinkable polyester film at the time of thermal shrinkage.

More specifically, it is because when the 90° C. thermal shrinkage ratio A2 of the film is set to a value of below 40%, the thermal shrinkage ratio is insufficient, and for a PET bottle having a complicated shape, the film becomes incapable of following the peripheral shape of that bottle so that a breakage phenomenon of the film at the time of thermal shrinkage may not be effectively suppressed.

Therefore, it is more preferable to set the lower limit of such 90° C. thermal shrinkage ratio A2 to a value of 45% or greater, and even more preferably to a value of 50% or greater.

On the other hand, in a case where the value of the above-mentioned 90° C. thermal shrinkage ratio A2 becomes excessively large, when the film is caused to thermally shrink, the film shrinks non-uniformly due to a rapid thermal response, and a breakage phenomenon at the time of thermal shrinkage may occur easily.

Therefore, it is preferable to set the upper limit of such 90° C. thermal shrinkage ratio A2 to a value of 90% or less, more preferably to a value of 85% or less, and even more preferably to a value of 80% or less.

4. Configuration (c)

Configuration (c) is a necessary configuration requirement to the effect that when the upper yield point stress in a stress-strain curve (SS curve) in the TD direction is designated as E1, and the lower yield point stress in the stress-strain curve in the TD direction is designated as E2, the numerical value represented by E1−E2 is set to a value of 5 MPa or less.

The reason for this is that by satisfying the configuration (c), even in a case where the thermal shrinkage ratios of the configurations (a) and (b) vary to some extent, in the heat-shrinkable polyester film at the time of thermal shrinkage, contributors of predetermined influential factors can be reduced, non-uniform shrinkage caused by a rapid thermal response can be suppressed, and as a result, breakage preventing properties of the film can be improved.

More specifically, it is because when the numerical value represented by E1−E2 is set to a value of above 5 MPa, in a case where the thermal shrinkage ratios of the configurations (a) and (b) vary to some extent, contributors of predetermined influential factors may not be reduced, non-uniform shrinkage caused by a rapid thermal response may not be suppressed, and as a result, breakage preventing properties of the film may not be improved.

Therefore, it is more preferable to set such a numerical value represented by E1−E2 to a value of 4 MPa or less, and even more preferably to a value of 3 MPa or less.

Here, referring to FIG. 4, the relationship between the shrinkage ratio (A1) of the heat-shrinkable polyester film under predetermined heating conditions (at hot water 80° C. for 10 seconds) and the difference (E1−E2) between the upper yield point stress E1 and the lower yield point stress E2 in the SS curve in the TD direction will be described.

Figure 4:
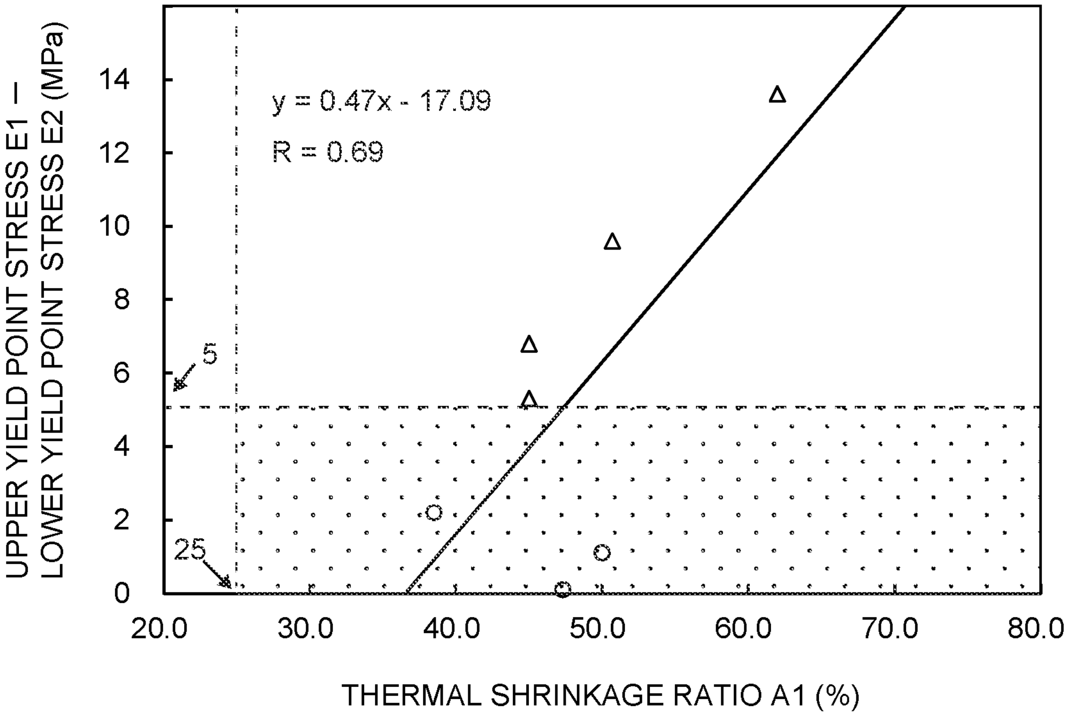
FIG. 4 is a diagram for describing the relationship between the shrinkage ratio (A1) of a heat-shrinkable polyester film under predetermined heating conditions (hot water at 80° C., for 10 seconds) and the E1−E2 in the SS curve in the TD direction.

That is, the axis of abscissa of FIG. 4 represents the value of the thermal shrinkage ratio A1(%) in the TD direction of the heat-shrinkable polyester film, and the axis of ordinate represents the difference (E1−E2) (MPa) between the upper yield point stress E1 and the lower yield point stress E2.

From such a characteristic curve shown in FIG. 4, it is understood that there is a high correlation (coefficient of correlation (R) in linear approximation is, for example, 0.69) between a predetermined thermal shrinkage ratio A1 and the difference (E1−E2) between the upper yield point stress E1 and the lower yield point stress E2.

Therefore, it is understood that by controlling the predetermined thermal shrinkage ratio A1 at the time of thermal shrinkage, the difference (E1−E2) between the upper yield point stress and the lower yield point stress of the heat-shrinkable polyester film can also be controlled.

Next, referring to FIG. 5, the relationship between the shrinkage ratio (A2) of the heat-shrinkable polyester film under predetermined heating conditions (hot water 90° C., 10 seconds) and the difference (E1−E2) between the upper yield point stress E1 and the lower yield point stress E2 in the SS curve in the TD direction will be described.

Figure 5:
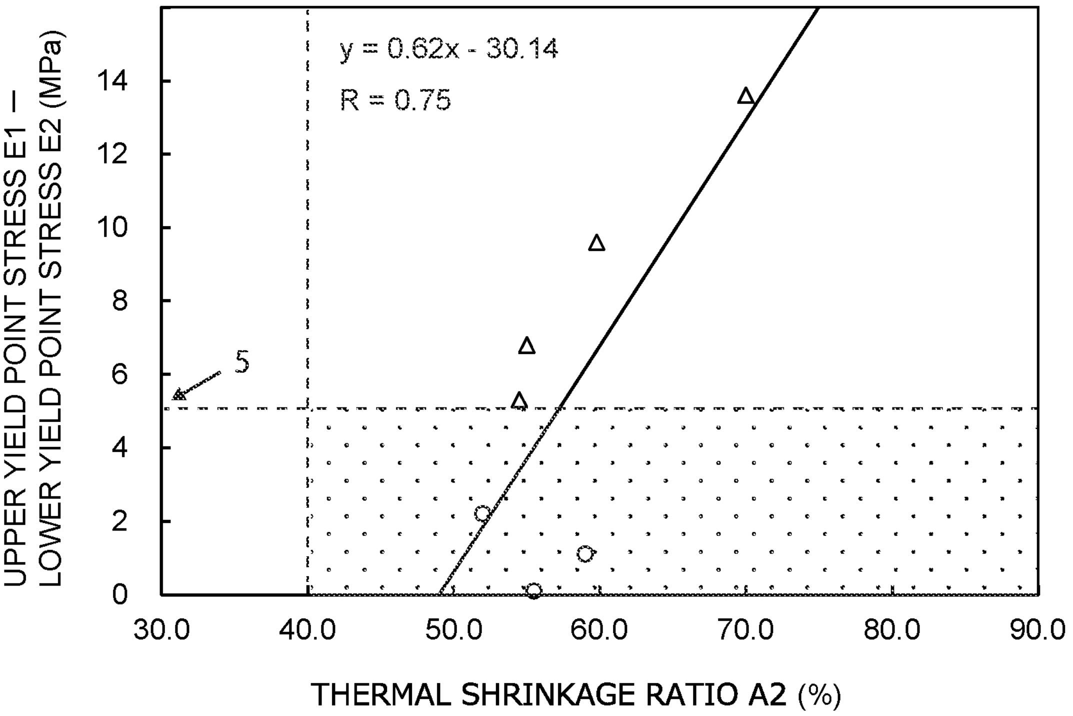
FIG. 5 is a diagram for describing the relationship between the shrinkage ratio (A2) of a heat-shrinkable polyester film under predetermined heating conditions (hot water at 90° C., for 10 seconds) and the difference (E1−E2) between the upper yield point stress E1 and the lower yield point stress E2 in the SS curve in the TD direction.

That is, the axis of abscissa of FIG. 5 represents the value of the thermal shrinkage ratio A2(%) in the TD direction of the heat-shrinkable polyester film, and the axis of ordinate represents the difference (E1−E2) (MPa) between the upper yield point stress E1 and the lower yield point stress E2.

From such a characteristic curve shown in FIG. 5, it is understood that there is a high correlation (coefficient of correlation (R) in linear approximation is, for example, 0.75) between a predetermined thermal shrinkage ratio A2 and the difference (E1−E2) between the upper yield point stress E1 and the lower yield point stress E2.

Therefore, it is understood that by controlling the predetermined thermal shrinkage ratio A2 at the time of thermal shrinkage, the difference (E1−E2) between the upper yield point stress and the lower yield point stress of the heat-shrinkable polyester film can also be controlled.

Figure 6:
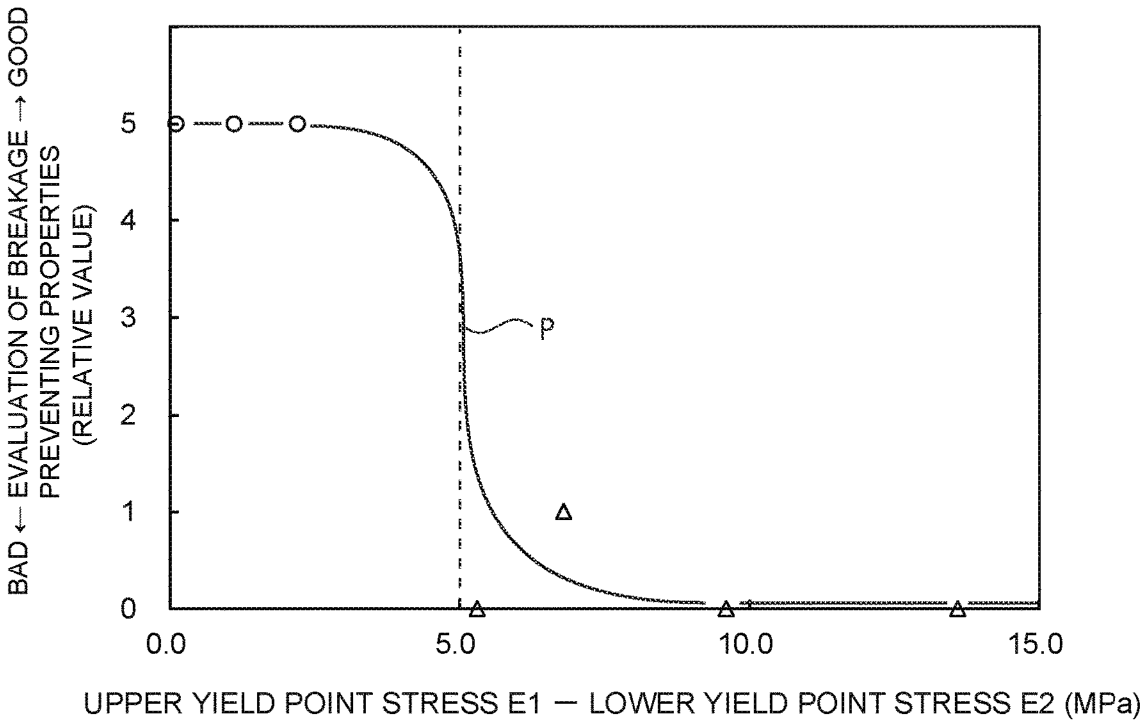
FIG. 6 is a diagram for describing the relationship between the difference (E1−E2) between the upper yield point stress E1 and the lower yield point stress E2 in the stress-strain curve (SS curve) in the TD direction and an evaluation (relative value) of breakage preventing properties.

Next, referring to FIG. 6, by plotting the difference E1−E2 between the upper yield point stress and the lower yield point stress in the SS curve of the heat-shrinkable polyester film under predetermined conditions (left to stand for 6 months in an atmosphere at a temperature 23° C. and a relative humidity of 50% RH) on the axis of abscissa, and plotting the value (relative value) of an evaluation of breakage preventing properties on the axis of ordinate, the relationship of these will be described.

That is, regarding the evaluation of breakage preventing properties, the value (relative value) of the evaluation of breakage preventing properties was calculated by taking ⊙ as 5, ○ as 3, Δ as 1, and x as 0.

From such a characteristic curve in FIG. 6, it is understood that when the value represented by E1−E2 is 5 MPa or less, the value (relative value) of the evaluation of breakage preventing properties is 3 or greater, and satisfactory breakage preventing properties are exhibited.

In contrast, it is understood that when the value represented by E1−E2 is above 5 MPa, the value (relative value) of the evaluation of breakage preventing properties is rapidly decreased, and sufficient breakage preventing properties are not exhibited.

Incidentally, in the present evaluation, it has been separately found that when the heat-shrinkable polyester film is a heat-shrinkable polyester film exhibiting satisfactory breakage preventing properties, satisfactory breakage preventing properties are exhibited even at the time of thermal shrinkage.

Figure 7:
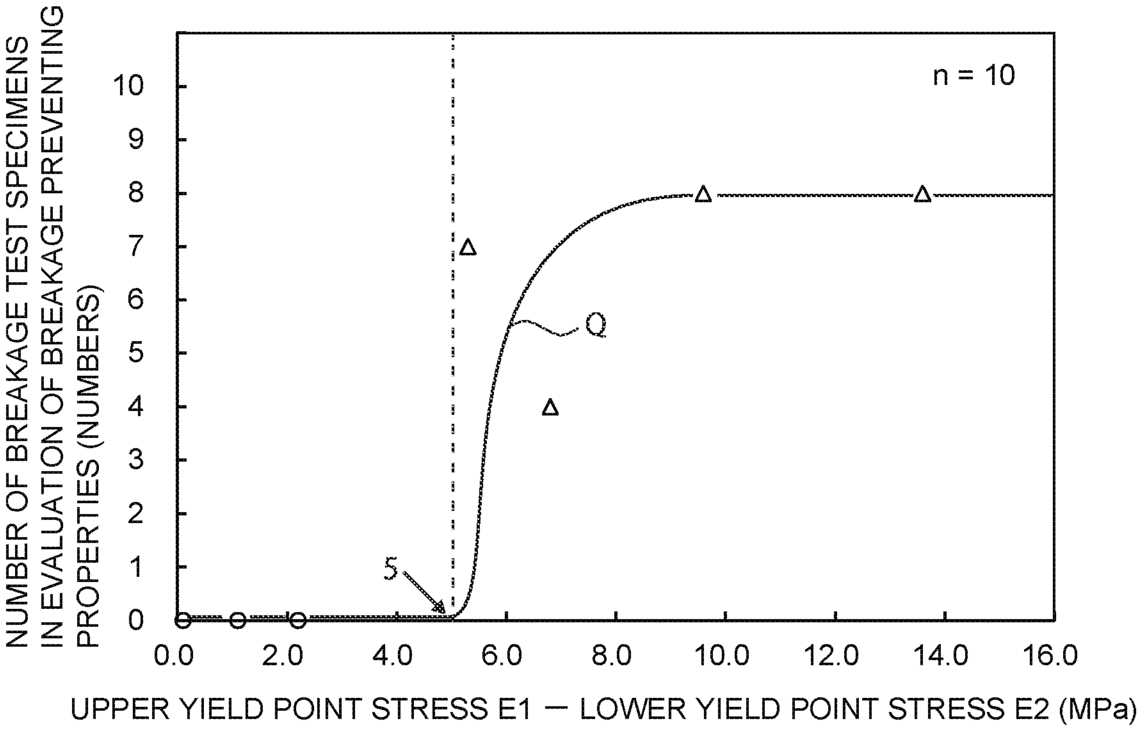
FIG. 7 is a diagram for describing the relationship between the difference (E1−E2) between the upper yield point stress E1 and the lower yield point stress E2 in a stress-strain curve (SS curve) in the TD direction and the number of test specimens (n=10) in which breakage occurred due to an evaluation of breakage preventing properties.

Next, referring to FIG. 7, by plotting the difference E1−E2 between the upper yield point stress and the lower yield point stress in the SS curve of the heat-shrinkable polyester film under predetermined conditions (left to stand for 6 months in an atmosphere at a temperature of 23° C. and a relative humidity of 50% RH) on the axis of abscissa, and plotting the value of the number of test specimens in which a breakage phenomenon occurred among ten test specimens in the evaluation of breakage preventing properties on the axis of ordinate, the relationship of these will be described.

From such a characteristic curve in FIG. 7, it is understood that when the value represented by E1−E2 is 5 MPa or less, the number of test specimens in which a breakage phenomenon occurred in the evaluation of breakage preventing properties is 0, and satisfactory breakage preventing properties are exhibited.

In contrast, it is understood that when the value represented by E1−E2 is above 5 MPa, the number of test specimens in which a breakage phenomenon occurred is 4 or more, and sufficient breakage preventing properties are not exhibited.

5. Optional Configuration Requirements (1) Configuration (d)

Configuration (d) is a configuration requirement related to t, which is the thickness (average thickness) of the heat-shrinkable polyester film of the first embodiment, and usually, it is considered as a suitable embodiment that the thickness is set to a value within the range of 10 to 100 μm.

The reason for this is that by specifically limiting the thickness t to a value within a predetermined range in this manner, the thermal shrinkage ratios A1 and A2, the numerical value represented by E1−E2 in the SS curve, and the like are set to values within predetermined ranges, respectively, and are likely to be controlled more easily.

It is therefore because contributors of predetermined influential factors can be reduced, non-uniform shrinkage caused by a rapid thermal response in the heat-shrinkable polyester film at the time of thermal shrinkage can be suppressed, and as a result, breakage preventing properties at the time of thermal shrinkage are improved.

More specifically, it is because when the thickness represented by t is below 10 μm or above 100 μm, non-uniform shrinkage caused by a rapid thermal response in the heat-shrinkable polyester film at the time of thermal shrinkage may not be suppressed, and breakage preventing properties at the time of thermal shrinkage may be markedly deteriorated.

Therefore, it is more preferable to set the thickness represented by t as the configuration (d) to a value within the range of 15 to 70 μm, and even more preferably to a value within the range of 20 to 40 μm.

(2) Configuration (e)

Configuration (e) is a configuration requirement related to the upper yield point stress E1 and the lower yield point stress E2 of the heat-shrinkable polyester film of the first embodiment, and it is considered as a suitable embodiment that the value of E1 is greater than the value of E2, E1 is set to a value within the range of 95 to 120 MPa, and E2 is set to a value within the range of 90 to 115 MPa.

The reason for this is that with regard to the relationship between E1 and E2 as such, by specifically limiting E1 and E2 to values within predetermined ranges, the numerical value represented by E1−E2 is set to a value within a predetermined range, and the numerical value is likely to be controlled more easily.

More specifically, it is because when the upper yield point stress E1 is below 95 MPa or above 120 MPa, the numerical value represented by E1−E2 may not be controlled to a value within a predetermined range.

Furthermore, it is because when the lower yield point stress E2 is similarly below 90 MPa or above 115 MPa, the numerical value represented by E1−E2 may not be controlled to a value within a predetermined range.

Therefore, as the configuration (e), it is more preferable to set E1 to a value within the range of 98 to 117 MPa and set E2 to a value within the range of 93 to 112 MPa, and it is even more preferable to set E1 to a value within the range of 101 to 114 MPa and set E2 to a value within the range of 96 to 109 MPa.

(3) Configuration (f)

Configuration (f) is a configuration requirement related to E2/E1, which is the ratio between the upper yield point stress E1 and the lower yield point stress E2 of the heat-shrinkable polyester film of the first embodiment, and it is a suitable embodiment that the value represented by E2/E1 is set to be above 0.9.

The reason for this is that by specifically limiting the numerical value represented by E2/E1 to a value within a predetermined range in this manner, it is easy to control the numerical value represented by E1−E2 to be within a predetermined range, and furthermore, breakage preventing properties at the time of thermal shrinkage of the film can be further improved.

More specifically, it is because the value represented by E2/E1, which is the ratio of the upper yield point stress E1 and the lower yield point stress E2, is 0.9 or less, the numerical value represented by E1−E2 may not be controlled to a value within a predetermined range.

Therefore, as the configuration (f), it is more preferable to set the value represented by E2/E1 to be above 0.93, and even more preferable to be above 0.96.

Here, referring to FIG. 8, the relationship between the ratio (E2/E1) of the upper yield point stress E1 and the lower yield point stress E2 in the SS curve in the TD direction and the difference (E1−E2) of the upper yield point stress E1 and the lower yield point stress E2 will be explained.

Figure 8:
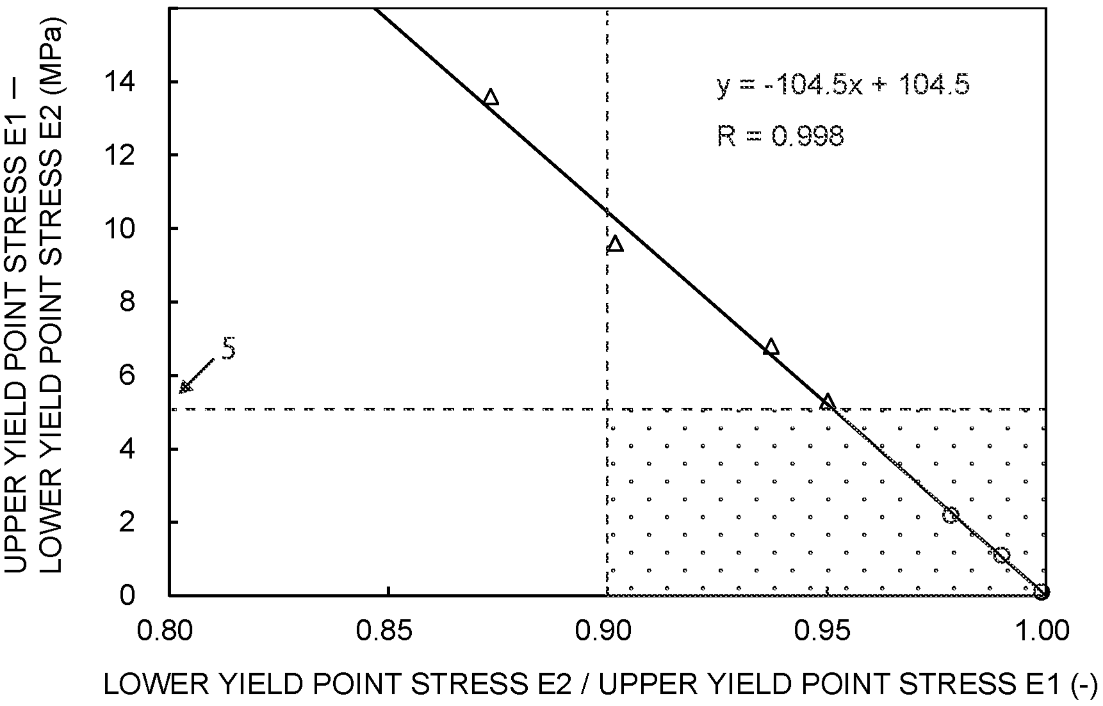
FIG. 8 is a diagram for describing the relationship between the ratio (E2/E1) of the upper yield point stress E1 and the lower yield point stress E2 and the difference (E1−E2) between the upper yield point stress E1 and the lower yield point stress E2 in the stress-strain curve (SS curve) in the TD direction.

That is, the axis of abscissa of FIG. 8 represents the ratio (E2/E1) (−) of the upper yield point stress E1 and the lower yield point stress E2 in the SS curve in the TD direction, and the axis of ordinate represents the difference (E1−E2) (MPa) between the upper yield point stress E1 and the lower yield point stress E2.

From such characteristic curve shown in FIG. 8, it is understood that there is a high correlation (coefficient of correlation (R) in linear approximation is, for example, 0.998) between the ratio (E2/E1) of the upper yield point stress E1 and the lower yield point stress E2 and the difference (E1−E2) between the upper yield point stress E1 and the lower yield point stress E2.

Therefore, it is understood that by controlling the ratio (E2/E1) of the upper yield point stress E1 and the lower yield point stress E2, the difference (E1−E2) between the upper yield point stress and the lower yield point stress of the heat-shrinkable polyester film can also be controlled.

(4) Configuration (g)

Configuration (g) is a configuration requirement related to a thermal shrinkage ratio B1 obtainable when a direction orthogonally intersecting the TD direction of the heat-shrinkable polyester film is designated as MD direction, and the heat-shrinkable polyester film is caused to shrink in this MD direction under the conditions of 10 seconds in hot water at 80° C., and it is considered as a suitable embodiment that the thermal shrinkage ratio B1 is set to a value of 3% or greater.

The reason for this is that by specifically limiting the 80° C. thermal shrinkage ratio B1 to be equal to or greater than a predetermined value in this manner, the influential factors for the numerical value represented by E1−E2 can be reduced, and breakage preventing properties at the time of thermal shrinkage of the film can be further improved.

More specifically, it is because when such an 80° C. thermal shrinkage ratio B1 is set to a value of below 3%, the influential factors for the numerical value represented by E1−E2 may not be reduced, and satisfactory breakage preventing properties may not be obtained at the time of thermal shrinkage of the film.

Therefore, as the configuration (g), it is more preferable to set the 80° C. thermal shrinkage ratio B1 to a value of 4% or greater, and even more preferably to a value of 5% or greater.

(5) Configuration (h)

Configuration (h) is a configuration requirement related to a thermal shrinkage ratio B2 obtainable when a direction orthogonally intersecting the TD direction of the heat-shrinkable polyester film is designated as MD direction, and the heat-shrinkable polyester film is caused to shrink in this MD direction under the conditions of 10 seconds in hot water at 90° C., and it is considered as a suitable embodiment that the thermal shrinkage ratio B2 is set to a value of 4% or greater.

The reason for this is that by specifically limiting the 90° C. thermal shrinkage ratio B2 to be equal to or greater than a predetermined value in this manner, the influential factors for the numerical value represented by E1−E2 can be reduced, and breakage preventing properties at the time of thermal shrinkage of the film can be further improved.

More specifically, it is because when such a 90° C. thermal shrinkage ratio B2 is set to a value of below 4%, the influential factors for the numerical value represented by E1−E2 may not be reduced, and satisfactory breakage preventing properties may not be obtained at the time of thermal shrinkage of the film.

Therefore, as the configuration (h), it is more preferable to set the 90° C. thermal shrinkage ratio B2 to a value of 5% or greater, and even more preferably to a value of 6% or greater.

(6) Configuration (i)

Configuration (i) is a configuration requirement related to the nominal tensile strain at break in the TD direction of the heat-shrinkable polyester film before shrinkage.

When such a nominal tensile strain at break is designated as C1, it is considered as a suitable embodiment that C1 is set to a value of 40% or greater.

The reason for this is that by specifically limiting the nominal tensile strain at break C1 to be equal to or greater than a predetermined value in this manner, the mechanical characteristics of the heat-shrinkable polyester film can be improved, and moreover, breakage preventing properties at the time of thermal shrinkage of the film can be further improved.

More specifically, it is because when the nominal tensile strain at break C1 is set to a value of below 40%, satisfactory mechanical characteristics of the heat-shrinkable polyester film may not be maintained.

On the other hand, it is because when such nominal tensile strain at break C1 is above 110%, a satisfactory thermal shrinkage ratio may not be obtained.

Therefore, as the configuration (i), it is more preferable to set such nominal tensile strain at break C1 to a value within the range of 42% to 105%, and even more preferably to a value within the range of 44% to 100%.

(7) Configuration (j)

Configuration (j) is a configuration requirement related to a stretch ratio in the MD direction (average MD direction stretch ratio, may be simply referred to as MD direction stretch ratio) of the heat-shrinkable polyester film before shrinkage.

It is considered as a suitable embodiment that such MD direction stretch ratio is set to a value within the range of 100% to 200%.

The reason for this is that by specifically limiting the MD direction stretch ratio to a value within a predetermined range in this manner, numerical values represented by A1, A2, B1, B2, C1, and E1−E2, and the like can be set to values within predetermined ranges, respectively, and controlled more easily and quantitatively, and moreover, breakage preventing properties at the time of thermal shrinkage can be improved.

More specifically, it is because when the MD direction stretch ratio is set to a value of below 100%, the product yield upon production may be notably decreased.

On the other hand, it is because when the MD direction stretch ratio is above 200%, the shrinkage ratio in the TD direction may be affected, and adjustment of the shrinkage ratio itself may be difficult.

Therefore, as the configuration (j), it is more preferable to set the MD direction stretch ratio to a value within the range of 110% to 190%, and even more preferably to a value within the range of 120% to 180%.

(8) Configuration (k)

Furthermore, configuration (k) is a configuration requirement related to a stretch ratio in the TD direction (average TD direction stretch ratio, may be simply referred to as TD direction stretch ratio) of the heat-shrinkable polyester film before thermal shrinkage.

It is considered as a suitable embodiment that such TD direction stretch ratio is set to a value within the range of 300% to 600%.

The reason for this is that by specifically limiting the TD direction stretch ratio to a value within a predetermined range in this manner, numerical values represented by A1, A2, B1, B2, C1, and E1–E2, and the like can be set to values within predetermined ranges, respectively, and controlled more easily and quantitatively, and moreover, breakage preventing properties at the time of thermal shrinkage can be improved.

More specifically, it is because when the TD direction stretch ratio is set to a value of below 300%, the shrinkage ratio in the TD direction may be notably decreased, and the use application of a usable heat-shrinkable polyester film may be excessively limited.

On the other hand, it is because when the TD direction stretch ratio is set to a value of above 600%, the shrinkage ratio may be markedly increased, and the use application of a usable heat-shrinkable polyester film may be excessively limited, or it may be difficult to control the stretch ratio itself to be constant.

Therefore, as the configuration (k), it is more preferable to set the TD direction stretch ratio to a value within the range of 320% to 550%, and even more preferably to a value within the range of 340% to 500%.

(9) Configuration (m)

Furthermore, configuration (m) is an optional configuration requirement to the effect that a haze value of the heat-shrinkable polyester film before thermal shrinkage as measured according to JIS K 7105 is set to a value of 5% or less.

The reason for this is that by specifically limiting the haze value to a value within a predetermined range in this manner, even the transparency of the heat-shrinkable polyester film can be controlled easily and quantitatively, and as transparency is satisfactory, general-purpose usability can be further enhanced.

More specifically, it is because when the haze value of the film before thermal shrinkage is set to a value of above 5%, transparency may be decreased, and it may be difficult to apply the film to decorative applications for PET bottles, or the like.

On the other hand, it is because when the haze value of the film before thermal shrinkage is excessively small, it may be difficult to stably control the haze value, and the product yield upon production may be notably decreased.

Therefore, as the configuration (m), it is more preferable to set the haze value of the film before thermal shrinkage to a value within the range of 0.1% to 3%, and even more preferably to a value within the range of 0.5% to 1%.

(10) Configuration (n)

Furthermore, configuration (n) is an optional configuration requirement to the effect that the heat-shrinkable polyester film of the first embodiment includes a non-crystalline polyester resin at a proportion of 90% to 100% by weight of the total quantity.

The reason for this is that by specifically limiting the content of the non-crystalline polyester resin in this manner, the thermal shrinkage ratio in the vicinity of the shrinkage temperature and breakage preventing properties can be adjusted more easily to desired ranges, and at the same time, the haze value and the like are also likely to be controlled quantitatively.

More specifically, it is because when the content of the non-crystalline polyester resin is set to a value of below 90%, control of the shrinkage ratio in the vicinity of the shrinkage temperature and breakage preventing properties of the heat-shrinkable polyester film may be difficult.

Furthermore, when the content of the crystalline polyester resin becomes excessively large, there is a possibility that the scope of reducing the contributors of predetermined influential factors may become markedly narrow.

Therefore, as the configuration (n), it is more preferable to set the content of the non-crystalline polyester resin to a value within the range of 91% to 100% by weight, and even more preferably to a value within the range of 92% to 100% by weight, of the total quantity.

(11) Others

It is preferable that various additives are blended into or attached to the inner part of the heat-shrinkable polyester film of the first embodiment, or to one surface or both surfaces of the heat-shrinkable polyester film.

More specifically, it is preferable to blend at least one of a hydrolysis inhibitor, an antistatic agent, an ultraviolet absorber, an infrared absorber, a colorant, an organic filler, an inorganic filler, an organic fiber, an inorganic fiber, and the like, usually in an amount within the range of 0.01% to 10% by weight, and more preferably in the range of 0.1% to 1% by weight, with respect to the total amount of the heat-shrinkable polyester film.

Figure 1B:
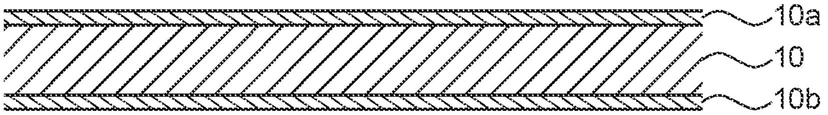

Furthermore, as shown in FIG. 1B, it is also preferable to laminate other resin layers 10*a* and 10*b* including at least one of these various additives on one surface or both surfaces of the heat-shrinkable polyester film 10.

In that case, when the thickness of the heat-shrinkable polyester film is taken as 100%, it is preferable that the single layer thickness or the total thickness of the other resin layers that are additionally laminated is usually set to a value within the range of 0.1% to 10%.

Then, it is preferable that the resin as a main component constituting the other resin layers may be the same polyester resin as the heat-shrinkable polyester film or is at least one of an acrylic resin different from that, an olefin resin, a urethane resin, a rubber material, and the like.

Figure 1C:
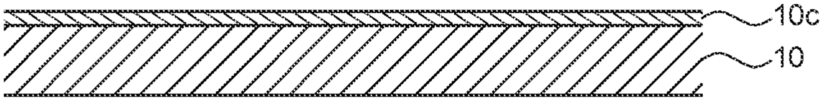

In addition, it is also preferable that a hydrolysis preventing effect and mechanical protection is further promoted by adopting a multilayer structure for the heat-shrinkable polyester film, or as shown in FIG. 1C, a shrinkage ratio adjusting layer 10*c* is provided on the surface of the heat-shrinkable polyester film 10 so that the shrinkage ratio of the heat-shrinkable polyester film becomes uniform in the plane.

Such a shrinkage ratio adjusting layer can be laminated by using an adhesive, a coating method, a heating treatment, or the like, according to the shrinkage characteristics of the heat-shrinkable polyester film.

More specifically, the thickness of the shrinkage ratio adjusting layer is within the range of 0.1 to 3 μm, and when the shrinkage ratio of the heat-shrinkable polyester film at a predetermined temperature is excessively large, it is preferable to laminate a shrinkage ratio adjusting layer of a type that suppresses the shrinkage ratio.

In addition, when the shrinkage ratio of the heat-shrinkable polyester film at a predetermined temperature is excessively small, it is preferable to laminate the shrinkage ratio adjusting layer of a type that enlarges the shrinkage ratio.

Therefore, it is intended to obtain a desired shrinkage ratio by means of the shrinkage ratio adjusting layer without producing various shrink films having different shrinkage ratios as the heat-shrinkable polyester film.

Second Embodiment

A second embodiment is an embodiment relating to a method for producing the heat-shrinkable polyester film of the first embodiment.

1. Step of Preparing and Mixing Raw Materials

First, it is preferable that main agents and additives, such as a non-crystalline polyester resin, a crystalline polyester resin, a rubber material, an antistatic agent, and a hydrolysis inhibitor, are prepared as raw materials.

Next, it is preferable that the prepared non-crystalline polyester resin, crystalline polyester resin, and the like are introduced into a stirring vessel while weighing the resins, and the mixture is mixed and stirred using a stirring device until the mixture becomes uniform.

2. Step of Producing Raw Sheet

Next, it is preferable that the uniformly mixed raw materials are dried into an absolute dry state.

Next, it is preferable that extrusion molding is typically performed, and a raw sheet having a predetermined thickness is produced.

More specifically, extrusion molding is performed, for example, under the conditions of an extrusion temperature of 180° C. by using an extruder (manufactured by TANABE PLASTICS MACHINERY CO., LTD.) with L/D24 and an extruding screw diameter of 50 mm, and a raw sheet having a predetermined thickness (usually, 10 to 100 μm) can be obtained.

3. Production of Heat-shrinkable Polyester Film

Next, the obtained raw sheet is heated and pressed, while being moved on rolls or between rolls by using a shrink film production apparatus, to produce a heat-shrinkable polyester film.

That is, it is preferable that the polyester molecules constituting the heat-shrinkable polyester film are crystallized into a predetermined shape by stretching the heat-shrinkable polyester film in a predetermined direction while basically expanding the film width at a predetermined stretching temperature and a predetermined stretch ratio and while heating and pressing the film.

Then, by solidifying the heat-shrinkable polyester film in that state, a thermally shrinkable heat-shrinkable polyester film that is used for decorations, labels, and the like can be produced.

4. Step of Inspecting Heat-shrinkable Polyester Film

It is preferable that the following characteristics and the like are measured continuously or intermittently for the produced heat-shrinkable polyester film, and a predetermined inspection step is provided.

That is, by measuring the following characteristics and the like through a predetermined inspection step and checking whether the characteristics fall in the values within predetermined ranges, a heat-shrinkable polyester film having more uniform shrinkage characteristics and the like can be obtained.

1) Visual inspection of external appearance of heat-shrinkable polyester film
2) Measurement of variation in thickness
3) Measurement of tensile modulus
4) Measurement of tear strength
5) Measurement of viscoelasticity characteristics based on SS curve Then, for the production of the heat-shrinkable polyester film of the second embodiment, it can be said that it is preferable to take measurement and calculation of the following (a) to (c) into consideration.

(a) Thermal shrinkage ratio A1 obtainable when the main shrinkage direction is designated as TD direction, and the heat-shrinkable polyester film is caused to shrink in the TD direction under the conditions of 10 seconds in hot water at 80° C.

(b) Thermal shrinkage ratio A2 obtainable when the heat-shrinkable polyester film is caused to shrink in the TD direction under the conditions of 10 seconds in hot water at 90° C.

(c) When the upper yield point stress in a stress-strain curve (SS curve) in the TD direction is designated as E1, and the lower yield point stress in the stress-strain curve in the TD direction is designated as E2, the difference E1−E2 of these numerical values.

Third Embodiment

A third embodiment is an embodiment relating to a method of using a heat-shrinkable polyester film.

Therefore, any known method of using a shrink film can be suitably applied.

For example, on the occasion of carrying out a method of using a heat-shrinkable polyester film, first, the heat-shrinkable polyester film is cut into an appropriate length or width, and at the same time, a long cylindrical object is formed.

Next, this long cylindrical object is supplied to an automatic label mounting apparatus (shrink labeler) and is cut into a necessary length.

Next, the long cylindrical object is externally fitted to a PET bottle or the like filled with contents.

Next, as a heating treatment for the heat-shrinkable polyester film externally fitted to a PET bottle or the like, the heat-shrinkable polyester film is passed through the interior of a hot air tunnel or a steam tunnel at a predetermined temperature.

Then, the heat-shrinkable polyester film is uniformly heated to thermally shrink the film by emitting radiant heat such as infrared radiation provided in these tunnels or blowing heated steam at about 90° C. from the surroundings.

Therefore, the heat-shrinkable polyester film is adhered closely to the outer surface of the PET bottle or the like, and thereby a labeled container can be quickly obtained.

Here, according to the heat-shrinkable polyester film of the present invention, at least configurations (a) to (c) are satisfied.

By doing so, the heat-shrinkable polyester film at the time of heat shrinkage is stably subjected to thermal shrinkage or the like, and satisfactory breakage preventing properties and the like can be obtained.

Furthermore, even in a case where the value of thermal shrinkage various to some extent, by limiting the difference between the upper yield point stress and the lower yield point stress in the stress-strain curve (SS curve) in the TD direction to be equal to or less than a predetermined value, the contributors of predetermined influential factors can be reduced, and in the heat-shrinkable polyester film at the time of thermal shrinkage, non-uniform shrinkage caused by a rapid thermal response can be suppressed so that as a result, breakage preventing properties at the time of thermal shrinkage can be enhanced.

Incidentally, since the heat-shrinkable polyester film of the present invention practically does not include a structural unit derived from lactic acid, there is an advantage that strict humidity management in the storage conditions and the like are unnecessary.

EXAMPLES

Hereinafter, the present invention will be described in detail based on Examples. However, the scope of rights of the present invention shall not be narrowed by the description of Examples without any particular reason.

Incidentally, the resins used in the Examples are as follows.

(PETG1)

Non-crystalline polyester composed of dicarboxylic acid: 100 mol % of terephthalic acid, and diol: 70 mol % of ethylene glycol, 25 mol % of 1,4-cyclohexanedimethanol, and 5 mol % of diethylene glycol (PETG2)

Non-crystalline polyester composed of dicarboxylic acid: 100 mol % of terephthalic acid, and diol: 72 mol % of ethylene glycol, 25 mol % of neopentyl glycol, and 3 mol % of diethylene glycol (APET)

Crystalline polyester composed of dicarboxylic acid: 100 mol % of terephthalic acid and diol: 100 mol % of ethylene glycol (PBT)

Crystalline polyester composed of dicarboxylic acid: 100 mol % of terephthalic acid and diol: 100 mol % of 1,4-butanediol

Example 1

1. Production of heat-shrinkable polyester film 100 parts by weight (pbw) of a non-crystalline polyester resin (PETG1) was used in a stirring vessel.

Next, this raw material was brought into an absolute dry state, and then extrusion molding was performed under the conditions of an extrusion temperature of 180° C. by using an extruder (manufactured by TANABE PLASTICS MACHINERY CO., LTD.) with L/D24 and an extruding screw diameter of 50 mm to obtain a raw sheet having a thickness of 100 μm.

Next, a heat-shrinkable polyester film having a thickness of 25 μm was produced from the raw sheet by using a shrink film production apparatus, at a stretching temperature of 81° C. and a stretch ratio (MD direction: 125%, TD direction: 480%).

2. Evaluation of heat-shrinkable polyester film (1) Evaluation 1: Variation in thickness The thickness (taking the desired value 25 μm as a reference value) of the obtained heat-shrinkable polyester film was measured by using a micrometer and evaluated according to the following criteria as Eva 1.

⊙(Very good): The variation in thickness has a value within the range of (reference value±0.1 μm).

○(Good): The variation in thickness has a value within the range of (reference value±0.5 μm).

Δ(Fair): The variation in thickness has a value within the range of (reference value±1.0 μm).

x (Bad): The variation in thickness has a value within the range of (reference value±3.0 μm).

(2) Evaluation 2: Thermal shrinkage ratio 1 (A1)

The obtained heat-shrinkable polyester film (TD direction) was immersed in hot water at 80° C. for 10 seconds (condition A1) by using a constant temperature tank, and the film was caused to thermally shrink.

Next, the thermal shrinkage ratio (A1) was calculated according to the following formula from the dimensional changes before and after the heating treatment at a predetermined temperature (80° C. hot water), and the thermal shrinkage ratio (A1) was evaluated according to the following criteria as Eva 2.

Thermal shrinkage ratio=(Length of film before thermal shrinkage−length of film after thermal shrinkage)/length of film before thermal shrinkage×100

⊙(Very good): Thermal shrinkage ratio (A1) has a value within the range of 30% to 75%.

○(Good): Thermal shrinkage ratio (A1) has a value within the range of 25% to 80% and is outside the above-described range of ⊙.

Δ(Fair): Thermal shrinkage ratio (A1) has a value within the range of 20% to 85% and is outside the above-described range of ○.

x (Bad): Thermal shrinkage ratio (A1) has a value of below 20% or above 85%.

(3) Evaluation 3: Thermal shrinkage ratio 2 (A2)

The obtained heat-shrinkable polyester film (TD direction) was immersed in hot water at 90° C. for 10 seconds (condition A2) by using a constant temperature tank, and the film was caused to thermally shrink.

Next, the thermal shrinkage ratio (A2) was calculated according to the following formula from the dimensional changes before and after the heating treatment at a predetermined temperature (90° C. hot water), and the thermal shrinkage ratio (A2) was evaluated according to the following criteria as Eva 3.

Thermal shrinkage ratio=(Length of film before thermal shrinkage−length of film after thermal shrinkage)/length of film before thermal shrinkage×100

⊙(Very good): Thermal shrinkage ratio (A2) has a value within the range of 45% to 80%.

○(Good): Thermal shrinkage ratio (A2) has a value within the range of 40% to 90% and is outside the above-described range of ⊙.

Δ(Fair): Thermal shrinkage ratio (A2) has a value within the range of 35% to 95% and is outside the above-described range of ○.

x (Bad): Thermal shrinkage ratio (A2) has a value of below 35% or above 95%.

(4) Evaluation 4: Thermal shrinkage ratio 3 (B1)

The obtained heat-shrinkable polyester film (MD direction) was immersed in hot water at 80° C. for 10 seconds (condition B1) by using a constant temperature tank, and the film was caused to thermally shrink.

Next, the thermal shrinkage ratio (B1) was calculated according to the following formula from the dimensional changes before and after the heating treatment at a predetermined temperature (80° C. hot water), and the thermal shrinkage ratio (B1) was evaluated according to the following criteria as Eva 4.

Thermal shrinkage ratio=(Length of film before thermal shrinkage−length of film after thermal shrinkage)/length of film before thermal shrinkage×100

- ⊙(Very good): Thermal shrinkage ratio (B1) has a value within the range of 4% to 10%.
- ○(Good): Thermal shrinkage ratio (B1) has a value within the range of 3% to 12% and is outside the above-described range of ⊙.
- Δ(Fair): Thermal shrinkage ratio (B1) has a value within the range of 2% to 14% and is outside the above-described range of ○.
- x (Bad): Thermal shrinkage ratio (B1) has a value of below 2% or above 14%.

(5) Evaluation 5: Thermal shrinkage ratio 4 (B2)

The obtained heat-shrinkable polyester film (MD direction) was immersed in hot water at 90° C. for 10 seconds (condition B2) by using a constant temperature tank, and the film was caused to thermally shrink.

Next, the thermal shrinkage ratio (B2) was calculated according to the following formula from the dimensional changes before and after the heating treatment at a predetermined temperature (90° C. hot water), and the thermal shrinkage ratio (B2) was evaluated according to the following criteria as Eva 5.

Thermal shrinkage ratio=(Length of film before thermal shrinkage−length of film after thermal shrinkage)/length of film before thermal shrinkage×100

- ⊙(Very good): Thermal shrinkage ratio (B2) has a value within the range of 5% to 14%.
- ○(Good): Thermal shrinkage ratio (B2) has a value within the range of 4% to 15% and is outside the above-described range of ⊙.
- Δ(Fair): Thermal shrinkage ratio (B2) has a value within the range of 3% to 16% and is outside the above-described range of ○.
- x (Bad): Thermal shrinkage ratio (B2) has a value of below 3% or above 16%.

(6) Evaluation 6: Yield point stress 1 (E1)

The upper yield point stress E1 in an SS curve in the TD direction of the obtained heat-shrinkable polyester film was measured and evaluated according to the following criteria as Eva 6.

- ⊙(Very good): The upper yield point stress (E1) has a value within the range of 98 to 117 MPa.
- ○(Good): The upper yield point stress (E1) has a value within the range of 95 to 120 MPa and is outside the above-described range of ⊙.
- Δ(Fair): The upper yield point stress (E1) has a value within the range of 92 to 123 MPa and is outside the above-described range of ○.
- x (Bad): The upper yield point s tress (E1) has a value of below 92 MPa or above 123 MPa.

(7) Evaluation 7: Yield point stress 2 (E2)

The lower yield point stress E2 in the SS curve in the TD direction of the obtained heat-shrinkable polyester film was measured and evaluated according to the following criteria as Eva 7.

- ⊙(Very good): The upper yield point stress (E2) has a value within the range of 93 to 112 MPa.
- ○(Good): The upper yield point stress (E2) has a value within the range of 90 to 115 MPa and is outside the above-described range of ⊙.
- Δ(Fair): The upper yield point stress (E2) has a value within the range of 87 to 118 MPa and is outside the above-described range of ○.
- x (Bad): The upper yield point stress (E2) has a value of below 87 MPa or above 118 MPa.

(8) Evaluation 8: Yield point stress 3 (E1−E2)

From the upper yield point stress E1 and the lower yield point stress E2 in the SS curve in the TD direction of the obtained heat-shrinkable polyester film, E1−E2 was calculated and evaluated according to the following criteria as Eva 8.

- ⊙(Very good): The value is 4 MPa or less.
- ○(Good): The value is 5 MPa or less.
- Δ (Fair): The value is 6 MPa or less.
- x (Bad): The value is above 6 MPa.

(9) Evaluation 9: Yield point stress 4 (E2/E1)

From the upper yield point stress E1 and the lower yield point stress E2 in the SS curve in the TD direction of the obtained heat-shrinkable polyester film, E2/E1 was calculated and evaluated according to the following criteria as Eva 9.

- ⊙(Very good): The value is above 0.93.
- ○(Good): The value is above 0.9 and is 0.93 or less.
- Δ(Fair): The value is above 0.87 and is 0.9 or less.
- x (Bad): The value is 0.87 or less.

(10) Evaluation 10: Nominal tensile strain at break (C1)

The nominal tensile strain at break C1 in the TD direction of the obtained heat-shrinkable polyester film was measured according to JIS K 7127/2/200 (1999) and was evaluated according to the following criteria as Eva 10.

- ⊙(Very good): The nominal tensile strain at break (C1) has a value within the range of 42% to 105%.
- ○(Good): The nominal tensile strain at break (C1) has a value within the range of 40% to 110% and is outside the above-described range of ⊙.
- Δ(Fair): The nominal tensile strain at break (C1) has a value within the range of 38% to 115% and is outside the above-described range of ○.
- x (Bad): The nominal tensile strain at break (C1) has a value of below 38% or above 118%.

(11) Evaluation 11: Breakage preventing properties

The obtained heat-shrinkable polyester film was left to stand for 6 months in an atmosphere at a temperature of 23° C. and a relative humidity of 50% RH.

Next, 1B type test specimens (10 pieces) that had been cut out were used as samples, the samples were subjected to a tensile test according to JIS K7161 at a tensile rate of 200 mm/min in an atmosphere at a temperature of 23° C. and a relative humidity of 50% RH, and the number of samples that broke in an elastic region in the stress-strain curve was evaluated as breakage preventing properties according to the following criteria as Eva 11.

- ⊙(Very good): A breakage phenomenon was not observed in all of ten test specimens.
- ○(Good): A breakage phenomenon was observed in one or fewer among ten test specimens.
- Δ(Fair): The occurrence of a breakage phenomenon was observed in four or more among ten test specimens.
- x (Bad): The occurrence of a breakage phenomenon was observed in six or more among ten test specimens.

(12) Evaluation 12: Haze

The haze value of the obtained heat-shrinkable polyester film was measured according to JIS K 7105, and the haze value was evaluated according to the following criteria as Eva 12.

- ⊙(Very good): The value is 1% or less.
- ○(Good): The value is 3% or less.

Δ(Fair): the value is 5% or less.

x (Bad): The value is above 5%.

Examples 2 and 3

In Examples 2 and 3, the thermal shrinkage ratios (A1, A2, B1, and B2), the yield point stresses (E1, E2, E1–E2, and E2/E1), and the like were evaluated in the same manner as in Example 1, except that various heat-shrinkable polyester films were produced in the same manner as in Example 1, by changing the respective values of the configurations (a) to (c) and the like as shown in Table 1. The results are shown in Table 2.

That is, in Example 2, evaluation was performed in the same manner as in Example 1, except that a heat-shrinkable polyester film having a thickness of 30 μm was produced by mixing 90 parts by weight of a non-crystalline polyester resin (PETG1) and 10 parts by weight of a crystalline polyester resin (APET) at these proportions, using the mixture as a raw material, and changing the extrusion conditions. The results are shown in Table 2.

Furthermore, in Example 3, evaluation was performed in the same manner as in Example 1, except that a heat-shrinkable polyester film having a thickness of 22 μm was produced by mixing 95 parts by weight of a non-crystalline polyester resin (PETG2) and 5 parts by weight of a crystalline polyester resin (PBT) at these proportions, using the mixture as a raw material, and changing the extrusion conditions. The results are shown in Table 2.

Comparative Examples 1 to 4

In Comparative Examples 1 to 4, heat-shrinkable polyester films that did not simultaneously satisfy the configuration requirements (a), (b), and (c) as shown in Table 1 were produced, and the heat-shrinkable polyester films were evaluated in the same manner as in Example 1.

In Comparative Example 1, a heat-shrinkable polyester film that did not satisfy the configuration requirement (c) as shown in Table 1 was produced, the heat-shrinkable polyester film was evaluated in the same manner as in Example 1, and the results are shown in Table 2.

That is, a heat-shrinkable polyester film having a thickness of 40 μm was produced by using a non-crystalline polyester resin (PETG1) as a raw material and changing the extrusion conditions.

Furthermore, in Comparative Example 2, a heat-shrinkable polyester film that did not satisfy the configuration requirement (c) as shown in Table 1 was produced, the heat-shrinkable polyester film was evaluated in the same manner as in Example 1, and the results are shown in Table 2.

That is, a heat-shrinkable polyester film having a thickness of 25 μm was produced by using a non-crystalline polyester resin (PETG1) as a raw material and changing the extrusion conditions.

Furthermore, in Comparative Example 3, a heat-shrinkable polyester film that did not satisfy the configuration requirement (c) as shown in Table 1 was produced, the heat-shrinkable polyester film was evaluated in the same manner as in Example 1, and the results are shown in Table 2.

That is, a heat-shrinkable polyester film having a thickness of 40 μm was produced by using a non-crystalline polyester resin (PETG2) as a raw material and changing the extrusion conditions.

Furthermore, in Comparative Example 4, a heat-shrinkable polyester film that did not satisfy the configuration requirement (c) as shown in Table 1 was produced, the heat-shrinkable polyester film was evaluated in the same manner as in Example 1, and the results are shown in Table 2.

That is, a heat-shrinkable polyester film having a thickness of 25 μm was produced by mixing 97 parts by weight of a non-crystalline polyester resin (PETG1) and 3 parts by weight of a crystalline polyester resin (PBT) at these proportions, using the mixture as a raw material, and changing the extrusion conditions.

TABLE 1

| | PETG1 (pbw) | PETG2 (pbw) | APET (pbw) | PBT (pbw) | Stretching temperature (° C.) | Thermal fixing temperature (° C.) | MD stretch ratio (%) | TD stretch ratio (%) | Thickness t (μm) |
|---|---|---|---|---|---|---|---|---|---|
| Example 1 | 90 | | | 10 | 81 | 80 | 125 | 480 | 25 |
| Example 2 | 90 | | 10 | | 83 | 82 | 100 | 500 | 30 |
| Example 3 | | 95 | | 5 | 90 | 85 | 180 | 350 | 22 |
| Comparative Example 1 | 100 | | | | 83 | 81 | 105 | 480 | 40 |
| Comparative Example 2 | 100 | | | | 86 | 85 | 111 | 500 | 25 |
| Comparative Example 3 | | 100 | | | 80 | 75 | 105 | 480 | 40 |
| Comparative Example 4 | 97 | | | 3 | 84 | 83 | 110 | 500 | 25 |

TABLE 2

| | Configuration | | | | | | | | | | | | | | | |
|---|---|---|---|---|---|---|---|---|---|---|---|---|---|---|---|---|
| | (a) A1 (%) | (b) A2 (%) | (c) E1 − E2 (MPa) | (f) E2/E1 (—) | Eva 1 | Eva 2 | Eva 3 | Eva 4 | Eva 5 | Eva 6 | Eva 7 | Eva 8 | Eva 9 | Eva 10 | Eva 11 | Eva 12 |
| Example 1 | 50.0 | 59.0 | 1.1 | 0.990 | ⊙ | ⊙ | ⊙ | ⊙ | ⊙ | ⊙ | ⊙ | ⊙ | ⊙ | ⊙ | ⊙ | ⊙ |
| Example 2 | 47.3 | 55.5 | 0.1 | 0.999 | ⊙ | ⊙ | ⊙ | ○ | ○ | ⊙ | ⊙ | ⊙ | ⊙ | ⊙ | ⊙ | ⊙ |
| Example 3 | 38.5 | 52.0 | 2.2 | 0.978 | ⊙ | ⊙ | ⊙ | ⊙ | ⊙ | ⊙ | ⊙ | ⊙ | ⊙ | ⊙ | ⊙ | ⊙ |
| Comparative Example 1 | 50.7 | 59.8 | 9.6 | 0.902 | ⊙ | ⊙ | ⊙ | X | X | ○ | Δ | X | ○ | ⊙ | X | ⊙ |
| Comparative Example 2 | 45.0 | 54.5 | 5.3 | 0.950 | ⊙ | ⊙ | ⊙ | ⊙ | ⊙ | ⊙ | ⊙ | Δ | ⊙ | ⊙ | X | ⊙ |
| Comparative Example 3 | 62.0 | 70.0 | 13.6 | 0.873 | ⊙ | ⊙ | ⊙ | ⊙ | ⊙ | ⊙ | ⊙ | X | Δ | ⊙ | X | ⊙ |
| Comparative Example 4 | 45.0 | 55.0 | 6.8 | 0.937 | ⊙ | ⊙ | ⊙ | ⊙ | ⊙ | ⊙ | ⊙ | X | ⊙ | ⊙ | Δ | ⊙ |

*Eva 1: Variation in thickness
*Eva 2 to 5: Thermal shrinkage ratios 1 to 4
*Eva 6 to 9: Yield point stresses 1 to 4
*Eva 10: Nominal tensile strain at break
*Eva 11: Breakage preventing properties
*Eva 12: Haze value

INDUSTRIAL APPLICABILITY

According to the present invention, disadvantages of conventional thermally shrinkable thermoplastic resin films, particularly heat-shrinkable polyester films were eliminated, and by satisfying predetermined configurations (a) to (c) and the like, a heat-shrinkable polyester film or the like having breakage preventing properties can now be effectively provided.

Particularly, by satisfying the configurations (a) to (c) and the like, even when the thermal shrinkage conditions vary or when the shape of the PET bottle to be applied has changed to some extent, the polyester shrinkage film can stably thermally shrink in a wide temperature region (for example, 70° C. to 100° C., for 10 seconds), and excellent breakage preventing properties can be obtained.

Therefore, it can be said that according to the heat-shrinkable polyester film of the present invention, the film can be applied to various PET bottles and the like, general-purpose usability can be markedly increased, and the industrial applicability thereof is extremely high.

The invention claimed is:

1. A heat-shrinkable polyester film derived from a polyester resin, wherein the polyester resin is a mixture of a non-crystalline polyester resin and a crystalline polyester resin, wherein the polyester resin includes 90% or more by weight, based on the total quantity of the polyester resin, of the non-crystalline polyester resin, and wherein the non-crystalline polyester resin being formed from a dicarboxylic acid composed of at least 80 mol % of terephthalic acid, and a diol composed of 50 mol % to 80 mol % of ethylene glycol and 20 mol % to 50 mol % of one or more diols selected from 1,4-cyclohexanedimethanol, neopentyl glycol, and diethylene glycol, and the crystalline polyester resin being at least one selected from polyethylene terephthalate, polyethylene naphthalate, polybutylene terephthalate, polybutylene naphthalate, and polypropylene terephthalate; and the heat-shrinkable polyester film having the following configurations (a) to (c):

(a) when a main shrinkage direction is designated as TD direction, and a thermal shrinkage ratio in the TD direction obtainable in a case where the heat-shrinkable polyester film is caused to shrink under the conditions of 10 seconds in hot water at 80° C. is designated as A1, A1 is set to a value of 25% or greater;

(b) when a thermal shrinkage ratio in the TD direction obtainable in a case where the heat-shrinkable polyester film is caused to shrink under the conditions of 10 seconds in hot water at 90° C. is designated as A2, the A2 is set to a value of 40% or greater; and (c) when an upper yield point stress in a stress-strain curve in the TD direction is designated as E1, and a lower yield point stress in the stress-strain curve in the TD direction is designated as E2, a numerical value represented by E1-E2 is set to a value of 5 MPa or less.

2. The heat-shrinkable polyester film according to claim 1, wherein a value of the upper yield point stress E1 is made greater than a value of the lower yield point stress E2, and at the same time, the E1 is set to a value within the range of 95 to 120 MPa, while the E2 is set to a value within the range of 90 to 115 MPa.

3. The heat-shrinkable polyester film according to claim 1, wherein a numerical value represented by E2/E1, which is a ratio of the upper yield point stress E1 and the lower yield point stress E2, is set to be above 0.9.

4. The heat-shrinkable polyester film according to claim 1, wherein when a direction orthogonally intersecting the TD direction is designated as MD direction, and a thermal shrinkage ratio in the MD direction obtainable in a case where the heat-shrinkable polyester film is caused to shrink under the conditions of 10 seconds in hot water at 80° C. is designated as BI, the BI is set to a value of 3% or greater.

5. The heat-shrinkable polyester film according to claim 1, wherein when a direction orthogonally intersecting the TD direction is designated as MD direction, and a thermal shrinkage ratio in the MD direction obtainable in a case where the heat-shrinkable polyester film is caused to shrink under the conditions of 10 seconds in hot water at 90° C. is designated as B2, the B2 is set to a value of 4% or greater.

6. The heat-shrinkable polyester film according to claim 1, wherein when a nominal tensile strain at break in the TD direction as measured according to JIS K 7127/2/200 (1999) is designated as CI, the CI is set to a value of 40% or greater.

7. The heat-shrinkable polyester film according to claim 1, wherein a haze value of the film before shrinkage as measured according to JIS K7105 is set to a value of 5% or less.

8. The heat-shrinkable polyester film according to claim 1, wherein the heat shrinkable film does not contain a polyester plasticizer.

* * * * *